US010815622B2

United States Patent
Chung et al.

(10) Patent No.: US 10,815,622 B2
(45) Date of Patent: Oct. 27, 2020

(54) METHODS AND APPARATUS FOR MANUFACTURING FIBER-BASED BEVERAGE HOLDERS

(71) Applicant: Footprint International, LLC, Scottsdale, AZ (US)

(72) Inventors: Yoke Dou Chung, Chandler, AZ (US); Brandon Michael Moore, Mesa, AZ (US); Yiyun Zhang, Gilbert, AZ (US); Michael Lembeck, San Tan Valley, AZ (US)

(73) Assignee: Footprint International, LLC, Scottsdale, AZ (US)

( * ) Notice: Subject to any disclaimer, the term of this patent is extended or adjusted under 35 U.S.C. 154(b) by 41 days.

(21) Appl. No.: 16/104,021

(22) Filed: Aug. 16, 2018

(65) Prior Publication Data

US 2020/0056335 A1 Feb. 20, 2020

(51) Int. Cl.

| D21H 11/14 | (2006.01) |
|---|---|
| D21J 3/02 | (2006.01) |
| B65D 71/50 | (2006.01) |
| D21H 17/56 | (2006.01) |
| D21H 21/18 | (2006.01) |
| D21H 21/20 | (2006.01) |
| D21H 17/55 | (2006.01) |
| D21H 21/16 | (2006.01) |

(52) U.S. Cl.
CPC .............. D21J 3/02 (2013.01); B65D 71/50 (2013.01); D21H 11/14 (2013.01); D21H 17/55 (2013.01); D21H 17/56 (2013.01); D21H 21/16 (2013.01); D21H 21/18 (2013.01); D21H 21/20 (2013.01)

(58) Field of Classification Search
USPC ...................................................... 162/164.6
See application file for complete search history.

(56) References Cited

U.S. PATENT DOCUMENTS

| 3,924,738 A | 12/1975 | Poupitch |
| 5,169,497 A | 12/1992 | Sarkar et al. |
| 9,856,608 B1 * | 1/2018 | Chung ................. D21H 17/675 |
| 9,869,062 B1 * | 1/2018 | Chung ................. B65D 65/466 |
| 2018/0016750 A1 | 1/2018 | Lauria |

FOREIGN PATENT DOCUMENTS

WO    WO 2013019834    2/2013

OTHER PUBLICATIONS

International Search Report, PCT/US19/46718, dated Oct. 28, 2019 (2 pages).
Written Opinion of the International Search Authority, PCT/US19/46718, dated Oct. 28, 2019 (7 pages).
Solenis LLC, Product Data, "Hercobond 6950 Paper Performance Additive". 1pg.
Mohamed Naceur Belacem & Antonio Pizzi, "Lignocellulosic Fibers and Wood Handbook, Renewable Materials for Today's Environment", 2016, John Wiley & Sons, Hoboken, New Jersey. Screenshot front cover of handbook and preface; 24 pgs.
Liisa Ohlsson & Robert Federer, "Efficient Use of Fluorescent Whitening Agents and Shading Colorants in the Production of White Paper and Board", Oct. 8-11, 2002, CIBA Speciality Chemicals Inc., South Africa; 6 pgs.
John F. Kennedy, Glyn O. Phillips and Peter A. Williams, "Cellulosic Pulps, Fibres and Materials", Published 2000, Woodhead Publishing Limited, Cellucon '98 Finland. Screenshot 2pgs.
Fobchem's Alkyl Ketene Dimer (ADK WAX). Screenshot 1pg www.fobchem.com.
Ashland Chemicals, Product Catalog "Ashland Always Solving", Aug. 3, 2018, Screenshot 1pg.
Shandong Tiancheng Chemical Co., LTD., "AKD Wax", Screenshot 1pg.

* cited by examiner

*Primary Examiner* — Mark Halpern
(74) *Attorney, Agent, or Firm* — Jennings, Strouss & Salmon PLC; Daniel R. Pote

(57) ABSTRACT

Methods and apparatus for vacuum forming a beverage carrier yoke using a slurry. The slurry comprises: a moisture barrier comprising AKD in the range of about 4% by weight; and a fiber base comprising OCC and NP.

11 Claims, 10 Drawing Sheets

US 10,815,622 B2

METHODS AND APPARATUS FOR MANUFACTURING FIBER-BASED BEVERAGE HOLDERS

TECHNICAL FIELD

The present invention relates, generally, to ecologically sustainable methods and apparatus for manufacturing beverage yokes and, more particularly, to the use of novel yoke designs and slurry compositions for use in vacuum forming molded fiber beverage carriers.

BACKGROUND

Pollution caused by single use plastic containers and beverage carriers is epidemic, scarring the global landscape and threatening the health of ecosystems and the various life forms that inhabit them. Six pack rings, or yokes, typically comprise a web of interconnected plastic rings used to carry multi-packs of cans or bottles. Since 1989, six-pack rings in the United States have been formulated to be photo-degradable, so that the plastic begins to disintegrate within a few weeks. More recently, the yokes are made from #4 Plastic, or LDPE photodegradable plastic (polyethylene). While these new materials reduce the environmental impact of beverage yokes, there remains a need for a more biocompatible solution.

Sustainable solutions for reducing plastic pollution continue to gain momentum. However, adoption requires these solutions to not only be good for the environment, but also competitive with plastics from both a performance and a cost standpoint. The present invention involves replacing plastic beverage yokes with revolutionary technologies in molded fiber without compromising product performance, within a competitive cost structure.

By way of brief background, molded paper pulp (molded fiber) has been used since the 1930s to make containers, trays and other packages, but experienced a decline in the 1970s after the introduction of plastic foam packaging. Paper pulp can be produced from old newsprint, corrugated boxes and other plant fibers. Today, molded pulp packaging is widely used for electronics, household goods, automotive parts and medical products, and as an edge/corner protector or pallet tray for shipping electronic and other fragile components. Molds are made by machining a metal tool in the shape of a mirror image of the finished fiber based product. Holes are drilled through the tool and then a screen is attached to its surface. A vacuum is drawn through the holes while the screen prevents the pulp from clogging the holes. The pulp particulates accumulate at the screen surface to form the molded part.

Fiber-based packaging products are biodegradable, compostable and, unlike plastics, do not migrate into the ocean. However, presently known fiber technologies are not well suited for beverage yokes due to the high stress concentrations surrounding the carrying holes, as well as the tendency of fiber based products to quickly degrade when wet.

Methods and apparatus are thus needed which overcome the limitations of the prior art.

Various features and characteristics will also become apparent from the subsequent detailed description and the appended claims, taken in conjunction with the accompanying drawings and this background section.

BRIEF SUMMARY

Various embodiments of the present invention relate to methods, chemical formulae, and apparatus for manufacturing vacuum molded, fiber-based beverage carrier yokes including, inter alia: i) slurry compositions which promote strength and structural rigidity in the finished fiber yoke; ii) slurry compositions which resists moisture penetration in the finished fiber yoke; iii) vacuum tooling configured to yield sharp edges surrounding the beverage can holes without the need for subsequent die cutting; iv) geometric designs which minimize weight to thereby reduce cycle time and increase throughput; v) geometric designs which securely retain the beverage containers while also promoting easy removal of each beverage container from the yoke; and vi) a fiber based slurry composition including in the range of 4% kymene 1500LV, 4% AKD, and 4% Hercobond 6950.

It should be noted that the various inventions described herein, while illustrated in the context of conventional slurry-based vacuum form processes, are not so limited. Those skilled in the art will appreciate that the inventions described herein may contemplate any fiber-based manufacturing modality, including 3D printing techniques.

Various other embodiments, aspects, and features are described in greater detail below.

BRIEF DESCRIPTION OF THE DRAWING FIGURES

Exemplary embodiments will hereinafter be described in conjunction with the appended drawing figures, wherein like numerals denote like elements, and:

Figure 6:
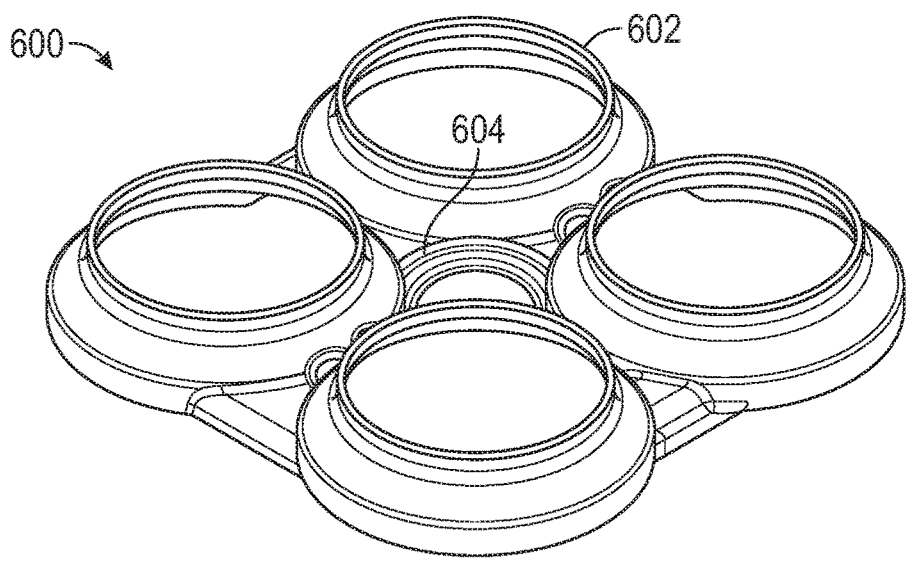
Figure 7:
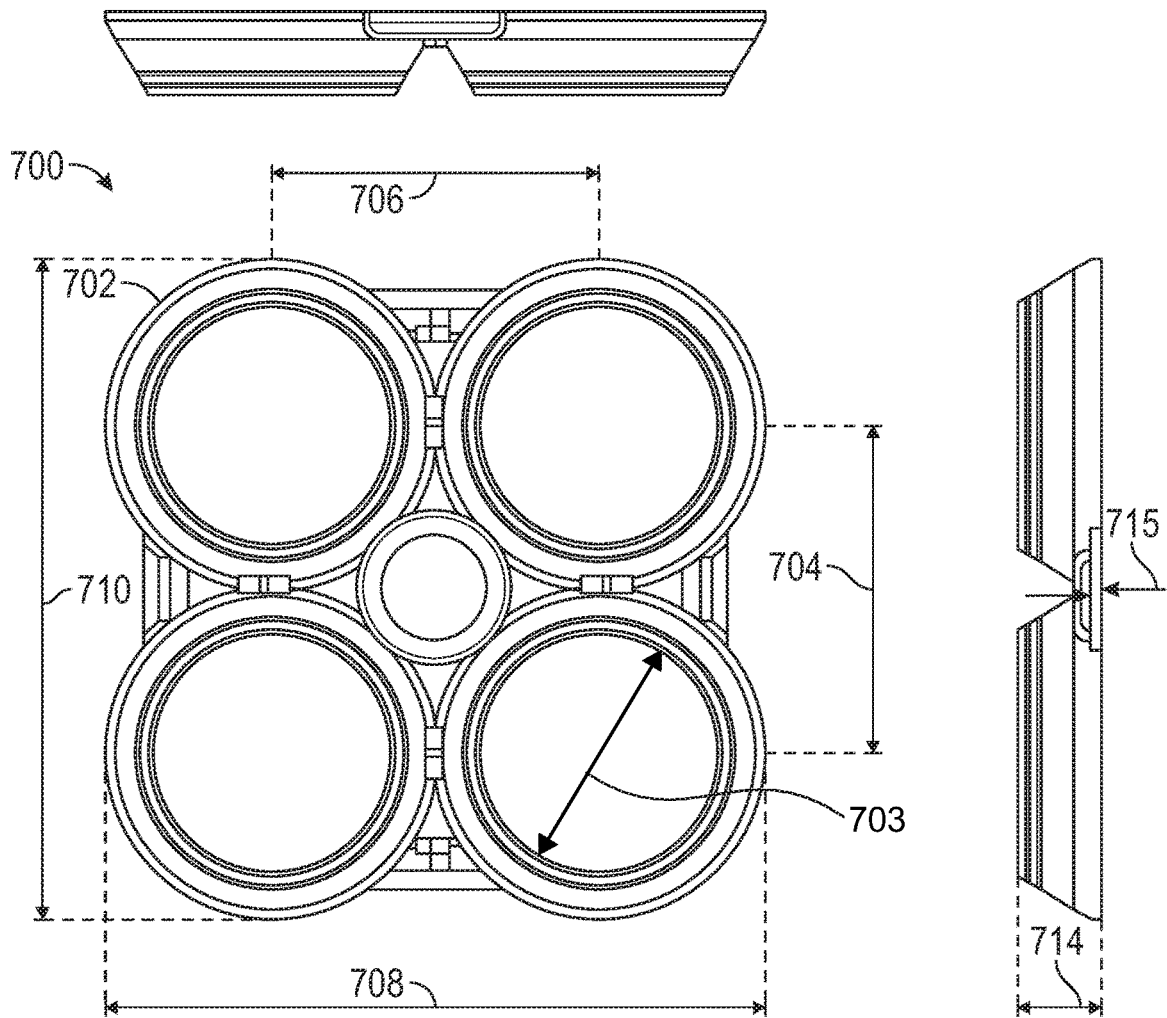
Figure 8:
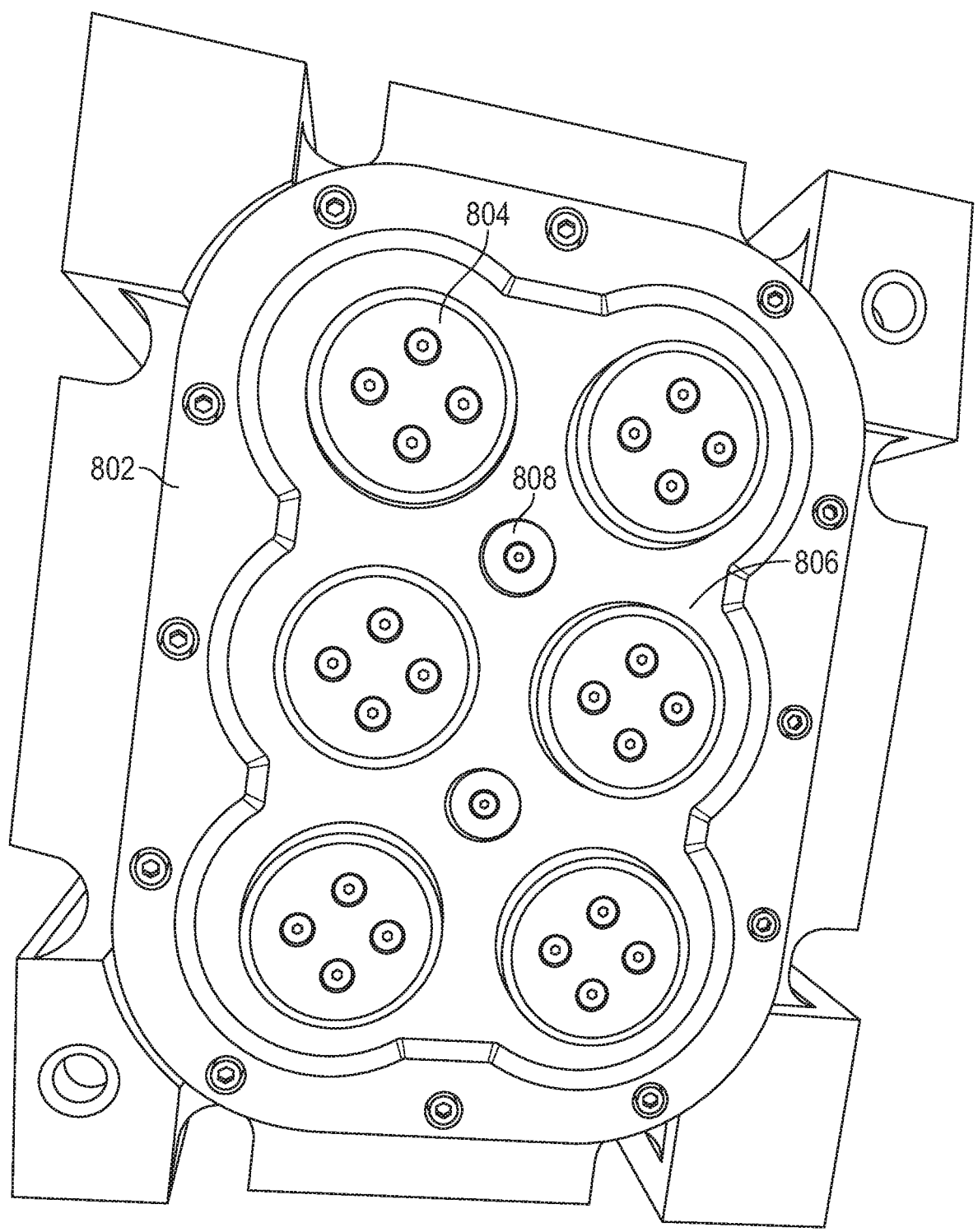
Figure 9:
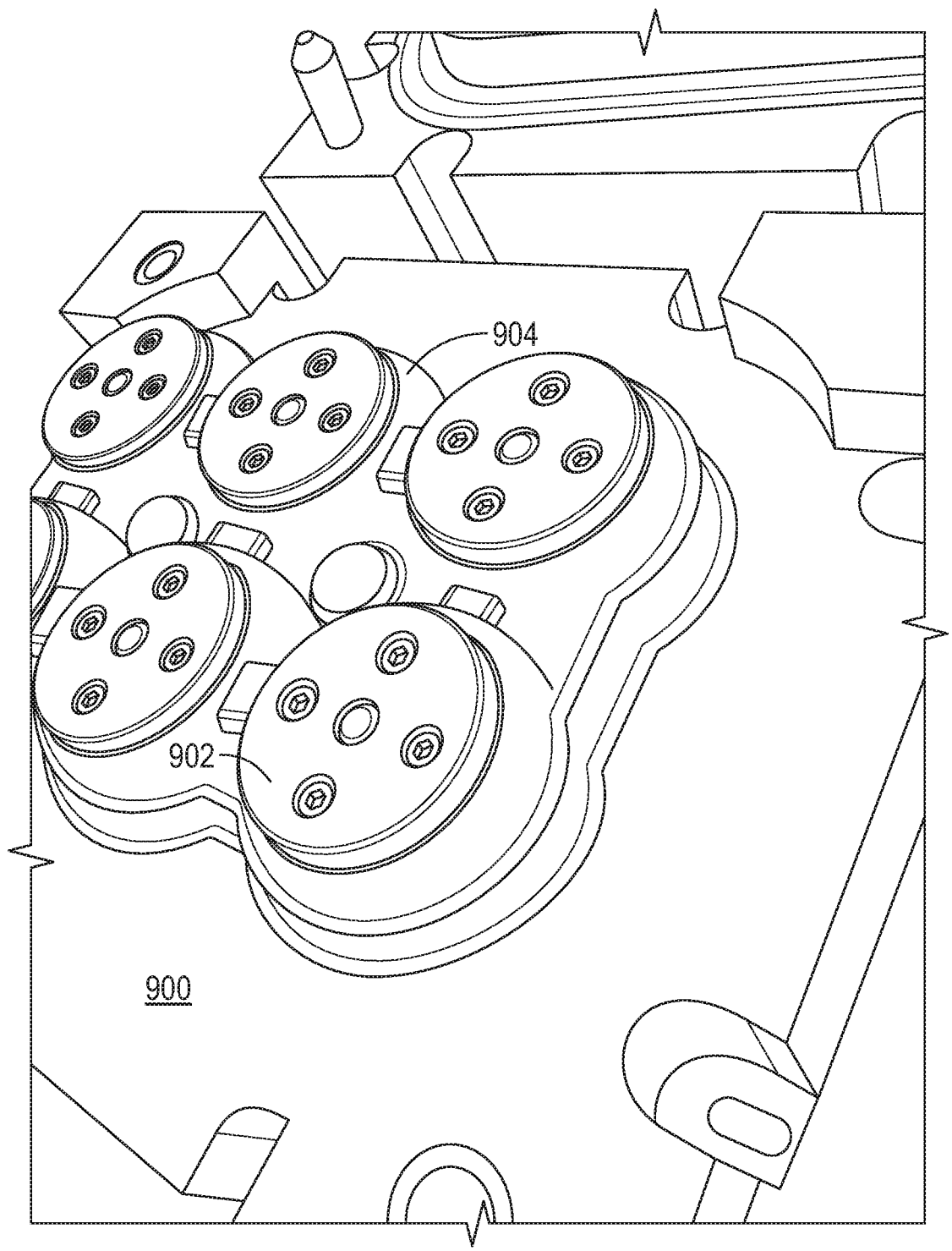
Figure 10:
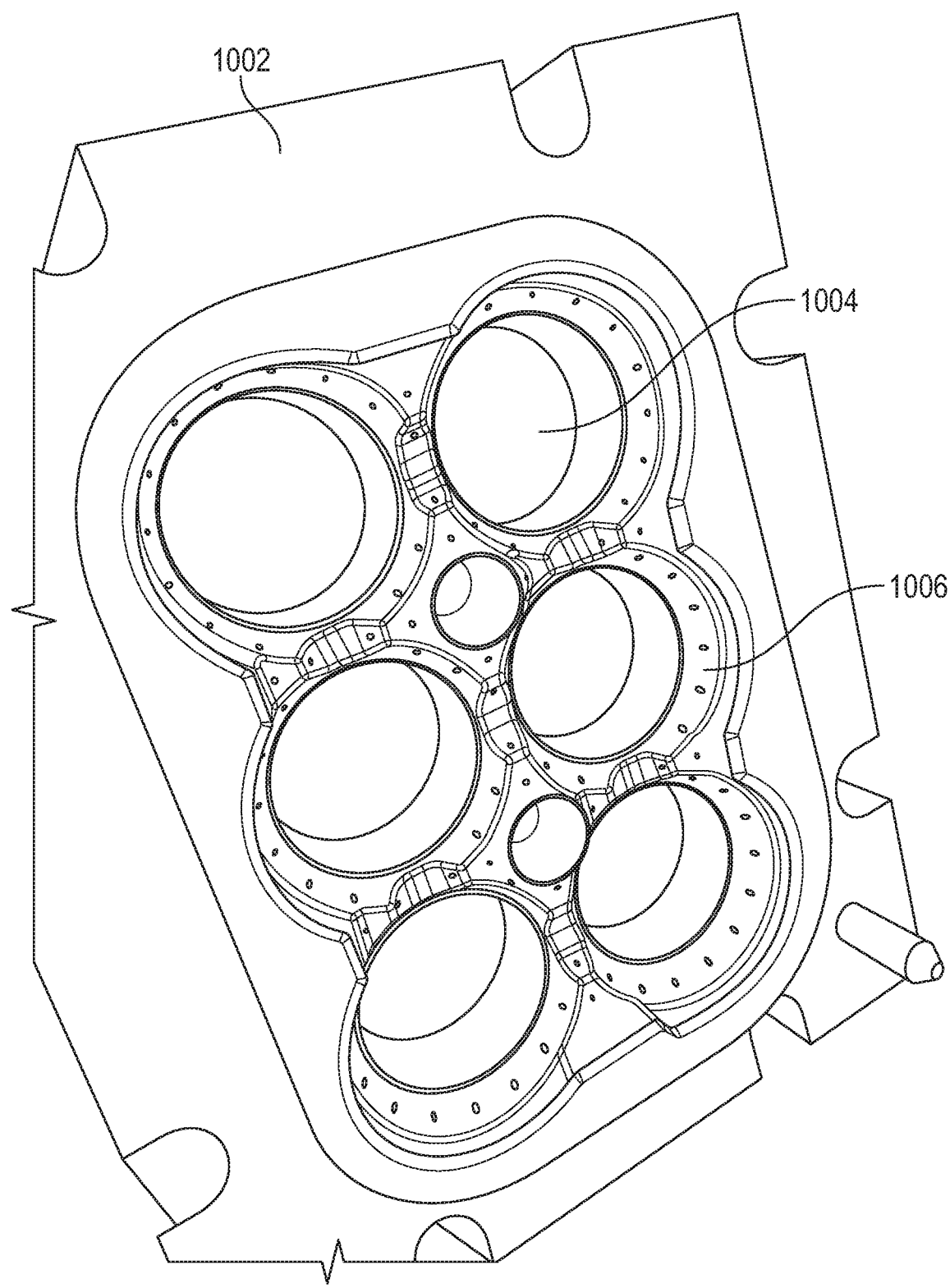
Figure 11:
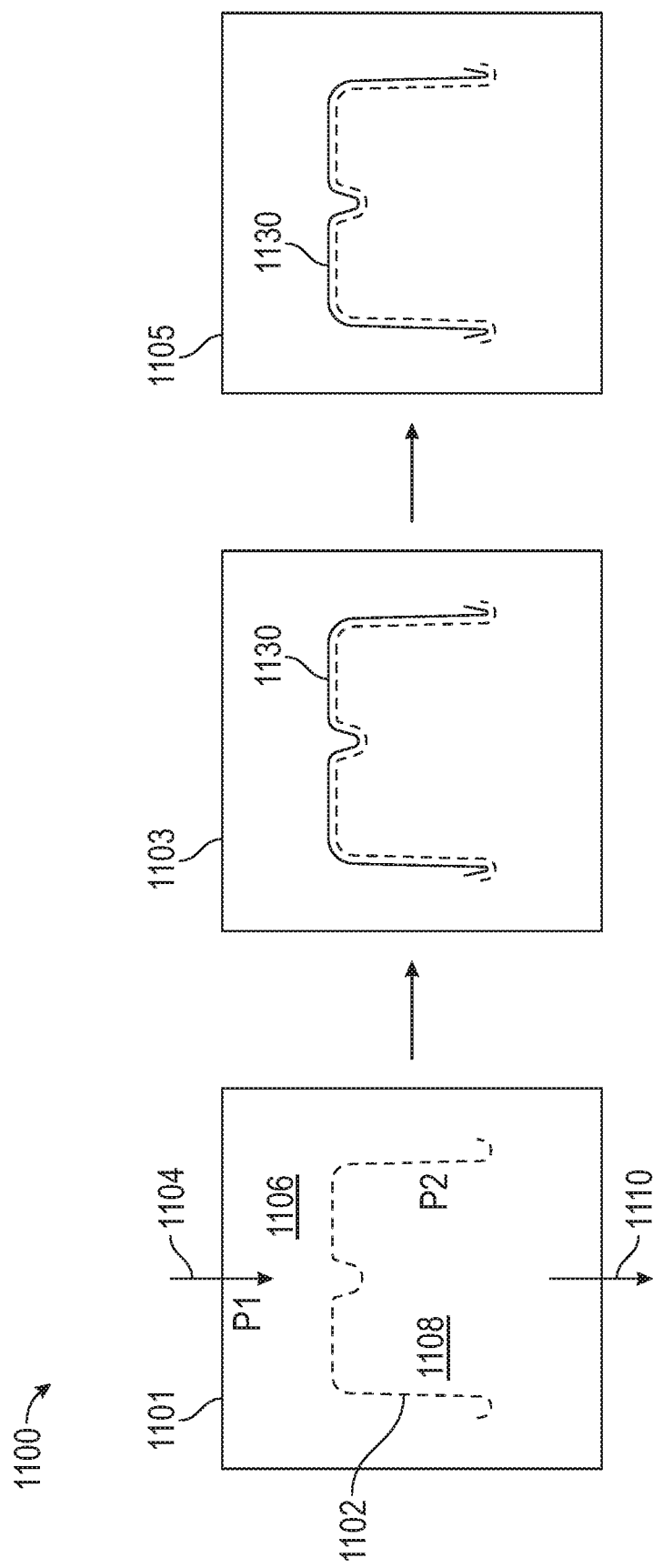
Figure 12:
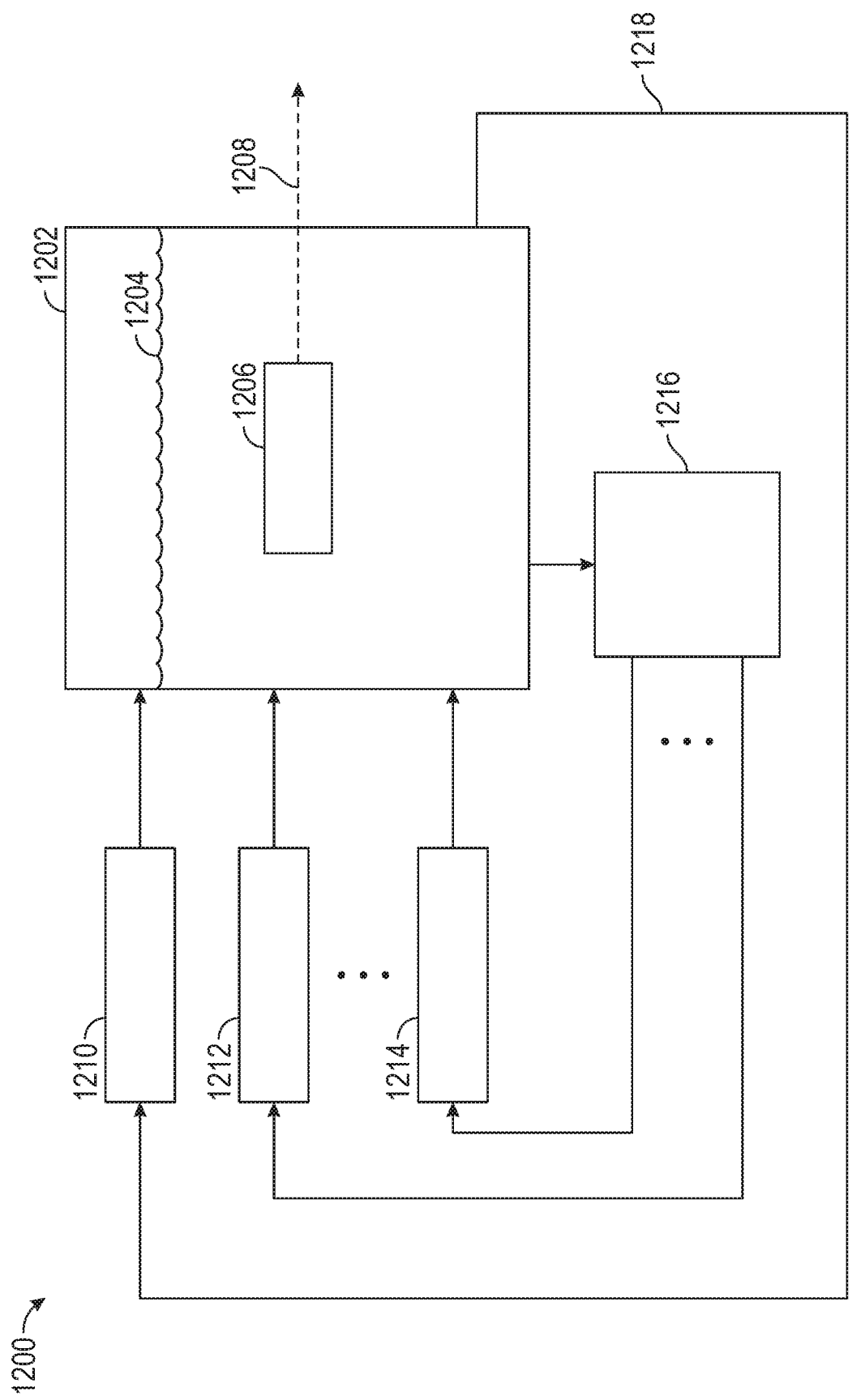

FIG. 6 a perspective view of a fiber based four pack beverage yoke in accordance with various embodiments;

FIG. 7 depicts respective top plan, side, and front elevation views of the yoke shown in FIG. 6 in accordance with various embodiments;

FIG. 8 is a perspective view of an exemplary male die component configured for use in vacuum forming a fiber based beverage yoke in accordance with various embodiments;

FIG. 9 is a perspective view of an exemplary male drying press component for drying a fiber based beverage yoke in accordance with various embodiments;

FIG. 10 is a perspective view of an exemplary female drying press component in accordance with various embodiments;

FIG. 11 is a schematic block diagram of an exemplary vacuum forming process using a fiber-based slurry in accordance with various embodiments; and FIG. 12 is a schematic block diagram of an exemplary closed loop slurry system for controlling the chemical composition of the slurry in accordance with various embodiments.

DETAILED DESCRIPTION OF PREFERRED EXEMPLARY EMBODIMENTS

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to fiber-based or pulp-base ring yokes for use in carrying bottles, cans, and other containers for both consumables and non-consumables. By way of non-limiting example, the present disclosure relates to particular geometries and chemical formulations of slurries adapted to address the unique challenges associated with beverage carrier yokes. The present disclosure further contemplates fiber-based yokes having structural features for enhanced strength.

Vacuum formed food carriers are well known, including trays equipped with press fit cup holders for supporting beverage containers on top of the carrier. However, presently known fiber based food carriers are not well suited for use as "six pack" rings or yokes for suspending beverage containers below the plane of the yoke, in part due to the challenges associated with gripping the containers with sufficient strength to retain them in the yoke, while at the same time facilitating easy removal of the containers form the yoke. That is, if the yoke material is too thick, it may be difficult to dislodge a can from the yoke. If the material is too thin, the yoke may not adequately retain the beverage containers as the yoke is carried by a user.

Various embodiments contemplate a carrying yoke having a substantially uniform thickness; other embodiments contemplate a greater thickness in high stress concentration regions, such as proximate the finger holes and the collars for carrying the beverage containers. In other embodiments ribs and/or other geometric structures may be used to enhance strength.

Other embodiments contemplate infusing the pulp slurry with a wet strength additive (e.g., Kymene), a dry strength component (e.g., Topcat® cationic additive), and/or moisture barriers (e.g., 3% AKD).

Other embodiments contemplate perforations or tear lines disposed proximate the container collars to facilitate removal of the containers from the yoke.

The present invention further contemplates fiber compositions comprising in the range of 90% old corrugated containers (OCC) and in the range of 10% softwood; other embodiments comprise a slurry base of approximately 30% newsprint (NP) and approximately 70% OCC.

Other embodiments contemplate a yoke having a total weight in the range of 4-15 grams; particular embodiments target 6.5 or 10 grams. For a given material, the resulting strength is proportional to thickness which is proportional to weight. One design metric involves optimizing strength, without unnecessarily increasing thickness, as increasing thickness also increases cycle time and decreases throughput.

Various embodiments contemplate dwell times in the vacuum chamber in the range of 20 seconds, and drying times in the range of 40 seconds @ 200° C., where drying time is also proportional to yoke thickness/weight.

To avoid unnecessary die cutting operations, various embodiments contemplate aluminum male and female die forms, augmented with tool steal for those die portions which define the inside ring that holds each can; in this way very tight tolerances may be maintained, yielding clean internal edges of the can holders.

With momentary reference to FIGS. 11 and 12, an overview of exemplary vacuum forming processes useful in the context of the present invention will now be presented.

FIG. 11 depicts an exemplary vacuum forming system and process 1100 using a fiber-based slurry includes a first stage 1101 in which mold (not shown for clarity) in the form of a mirror image of the product to be manufactured is envelop in a thin wire mesh form 1102 to match the contour of the mold. A supply 1104 of a fiber-based slurry 1104 is input at a pressure (P1) 1106 (typically ambient pressure). By maintaining a lower pressure (P2) 1108 inside the mold, the slurry is drawn through the mesh form, trapping fiber particles in the shape of the mold, while evacuating excess slurry 1110 for recirculation back into the system.

With continued reference to FIG. 11, a second stage 1103 involves accumulating a fiber layer 1130 around the wire mesh in the shape of the mold. When the layer 1130 reaches a desired thickness, the mold enters a third stage 1105 for either wet or dry curing. In a wet curing process, the formed part is transferred to a heated press (not shown) and the layer 1130 is compressed and dried to a desired thickness, thereby yielding a smooth external surface finish for the finished part. In a dry curing process, heated air may be passed directly over the layer 1130 to remove moisture therefrom, resulting in a more textured finish much like a conventional egg carton.

In accordance with various embodiments the vacuum mold process is operated as a closed loop system, in that the unused slurry is re-circulated back into the bath where the product is formed. As such, some of the chemical additives (discussed in more detail below) are absorbed into the individual fibers, and some of the additive remains in the water-based solution. During vacuum formation, only the fibers (which have absorbed some of the additives) are trapped into the form, while the remaining additives are re-circulated back into the tank. Consequently, only the additives captured in the formed part must be replenished, as the remaining additives are re-circulated with the slurry in solution. As described below, the system maintains a steady state chemistry within the vacuum tank at predetermined volumetric ratios of the constituent components comprising the slurry.

FIG. 12 is a closed loop slurry system 1200 for controlling the chemical composition of the slurry. In the illustrated embodiment a tank 1202 is filled with a fiber-based slurry 1204 having a particular desired chemistry, whereupon a vacuum mold 1206 is immersed into the slurry bath to form a molded part. After the molded part is formed to a desired thickness, the mold 1206 is removed for subsequent processing 1208 (e.g., forming, heating, drying, top coating, and the like).

With continued reference to FIG. 12, a fiber-based slurry comprising pulp and water is input into the tank 1202 at a slurry input 1210. One or more additional components or chemical additives may be supplied at respective inputs 1212-1214. The slurry may be re-circulated using a closed loop conduit 1218, adding additional pulp and/or water as needed. To maintain a steady state balance of the desired chemical additives, a sampling module 1216 is configured to measure or otherwise monitor the constituent components of the slurry, and dynamically or periodically adjust the respective additive levels by controlling respective inputs 1212-1214. Typically the slurry concentration is around 0.1-1%. In one embodiment, the various chemical constituents are maintained at a predetermined desired percent by volume;

alternatively, the chemistry may be maintained based on percent by weight or any other desired control modality.

The chemical formulae (sometimes referred to herein as "chemistries") and geometric configurations for various fiber-based beverage carriers, as well as their methods for manufacture, will now be described in conjunction with FIGS. 1-10.

Figure 1:
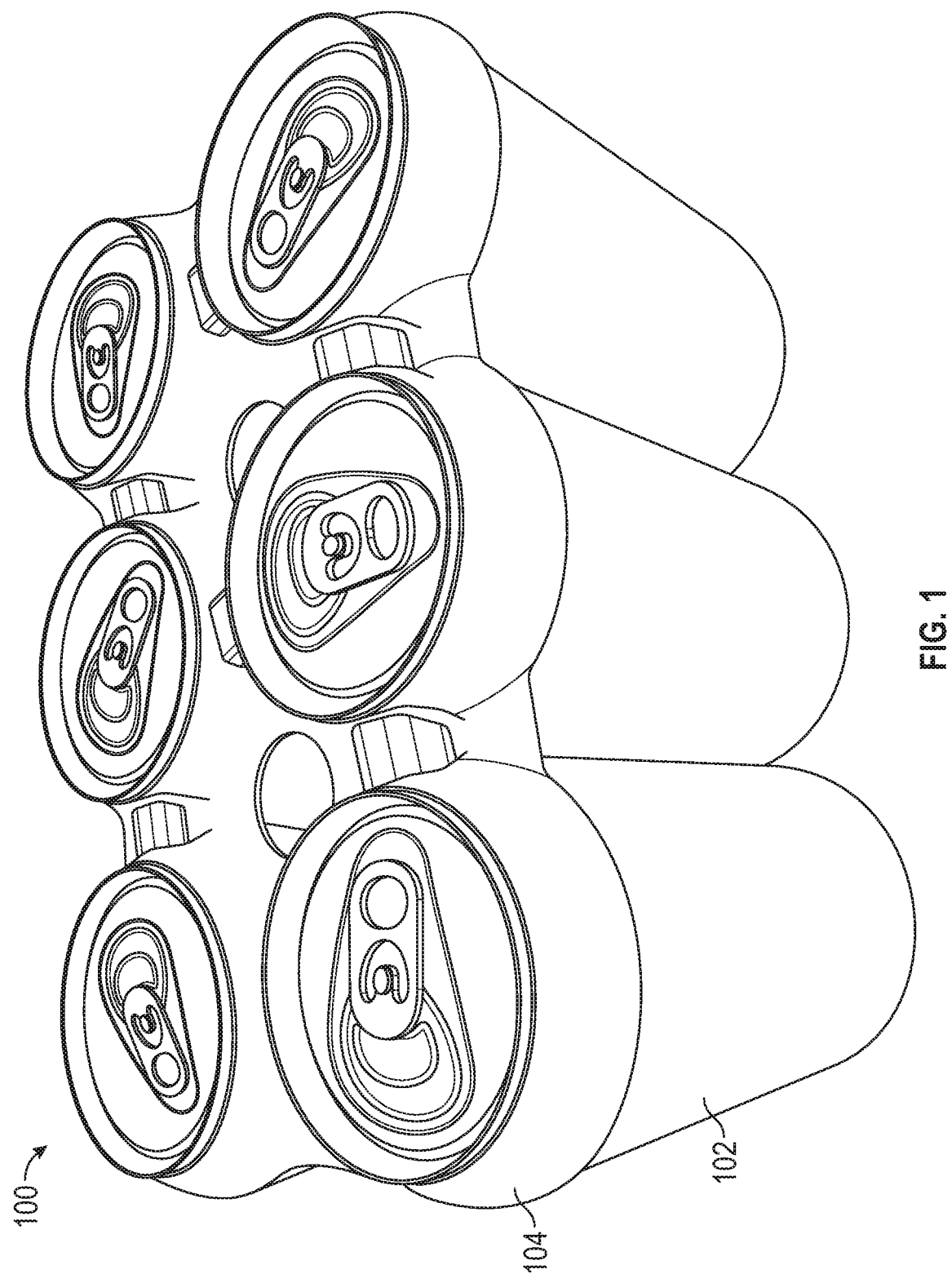
FIG. 1 is a perspective view of a fiber based beverage yoke carrying six beverage cans in accordance with various embodiments.

FIG. 1 illustrates a fiber based beverage yoke assembly 100 including a six pack ring palette 104 configured to securely carry a plurality of beverage cans 102.

Figure 2:
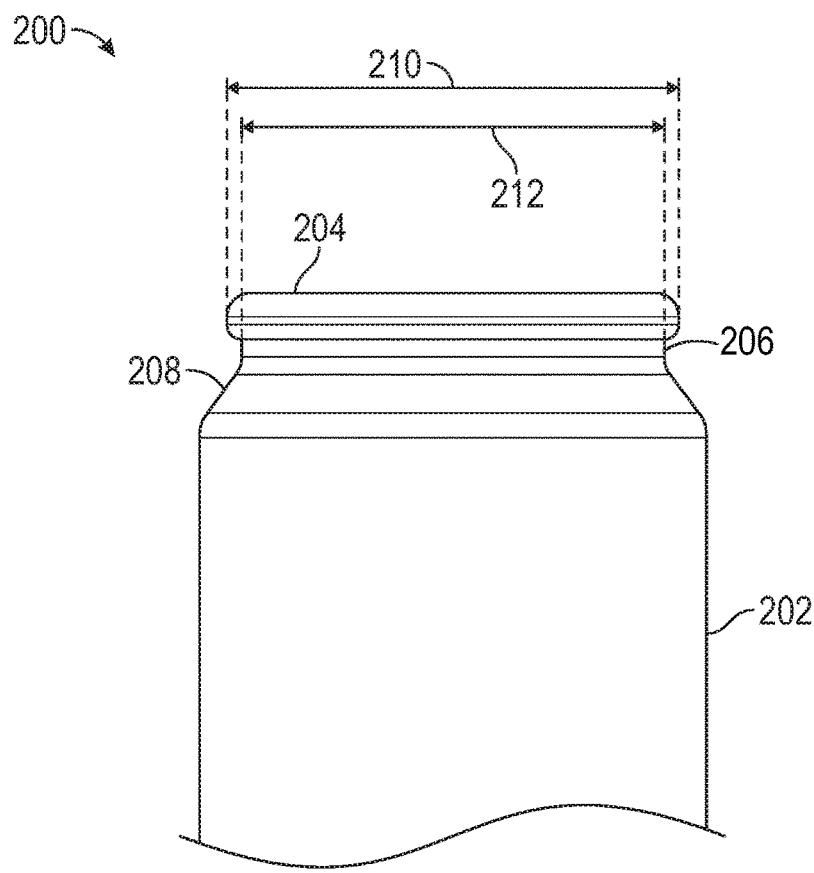
FIG. 2 is a schematic diagram of a beverage can illustrating the shape of the top of the can to which a beverage yoke is secured in accordance with various embodiments.

FIG. 2 depicts a typical beverage can 200 having a body 202, a cap 204, a neck 206, and a shoulder 208 extending between the neck and the body. As shown, the diameter 212 of the neck is slightly smaller than the diameter 210 of the cap. Consequently, the yoke collar within which each can is secured should advantageously exhibit a diameter which is equal to or slightly greater than dimension 212, while being equal to or slightly less than dimension 212. In addition, the yoke material may be pliable enough to resiliently deform slightly without tearing. In this way, the collar may slip over the cap 204 when a can is inserted into the yoke, and thereafter snuggly retain the can about shoulder 208 and or neck 206. As discussed below, the slurry composition and finished yoke thickness may be configured to yield a yoke of sufficient strength to securely retain cans, while at the same time allow easy removal of the cans from the yoke, as desired.

Figure 3:
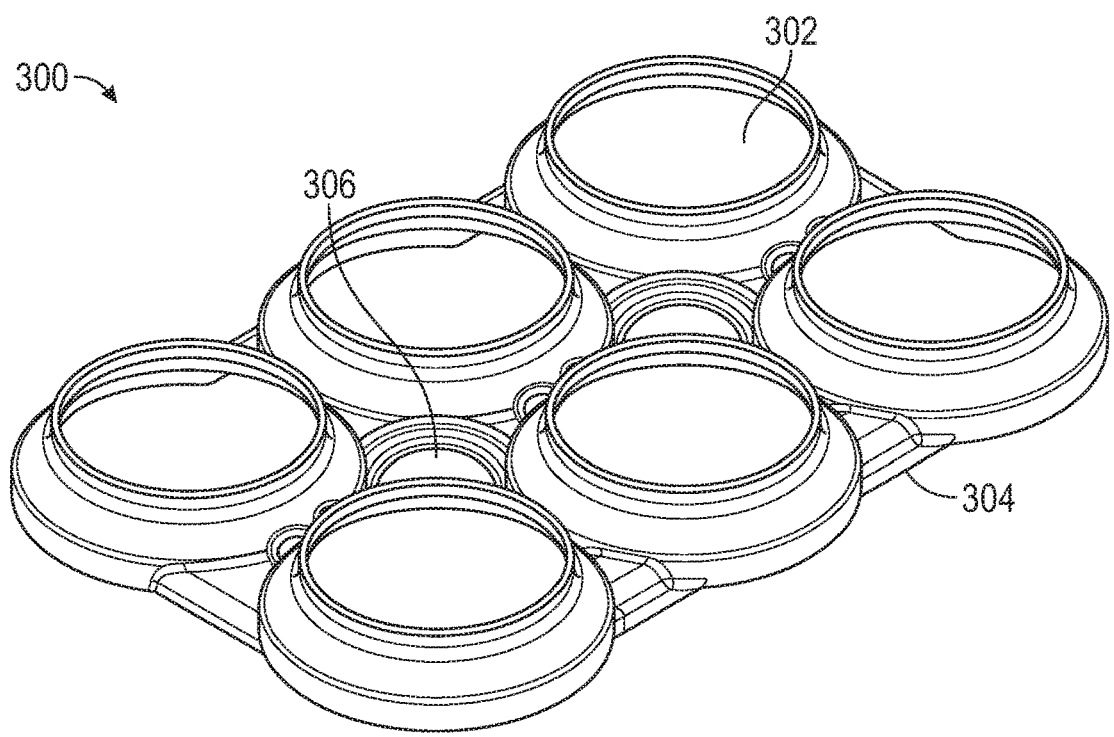
FIG. 3 is a perspective view of an exemplary fiber based six pack beverage yoke in accordance with various embodiments.

FIG. 3 depicts an exemplary fiber based six pack beverage yoke 300 including a plurality of collars 302 interconnected by a web 304 having one or more finger holes 306 to facilitate carrying.

Figure 4:
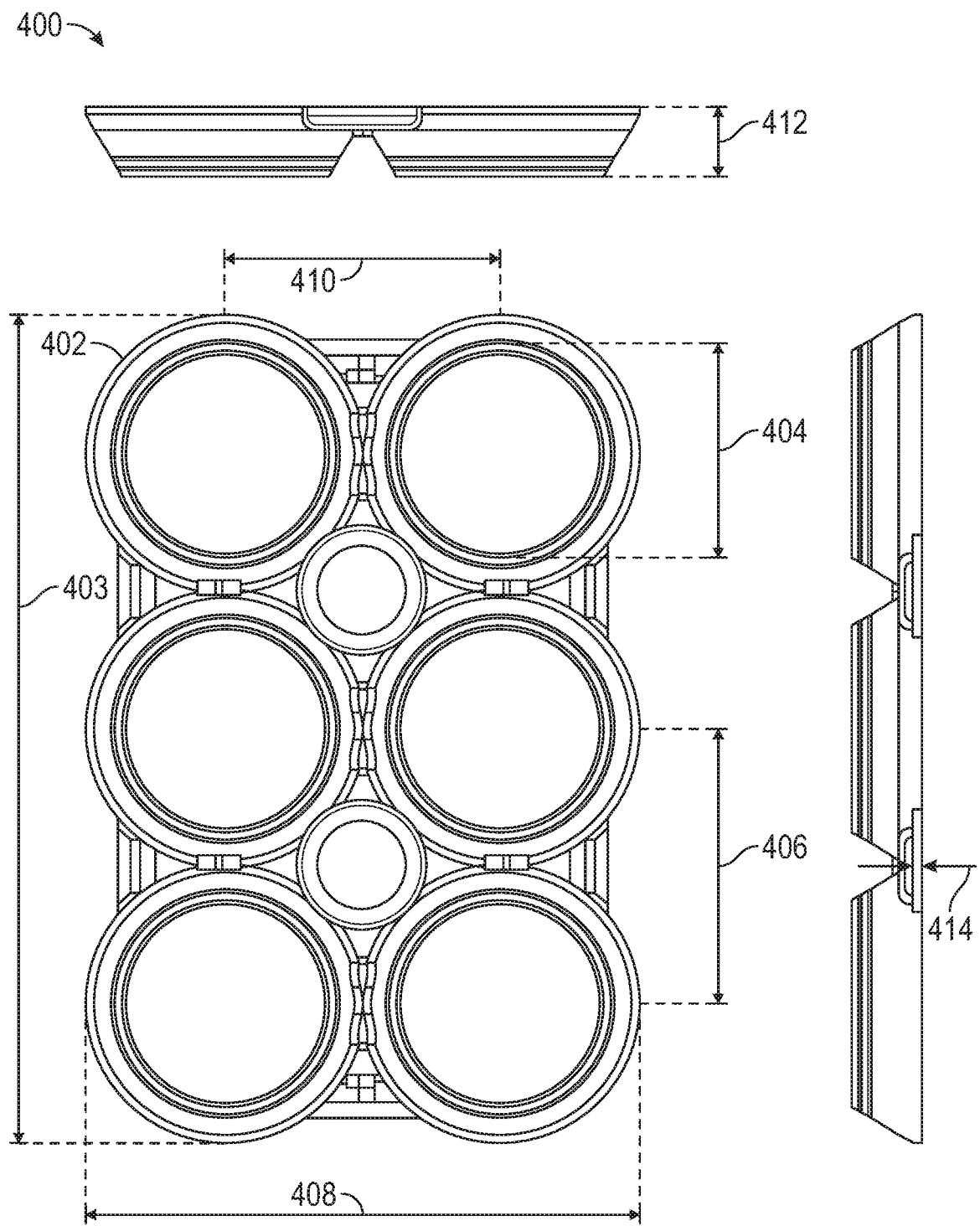
FIG. 4 depicts respective top plan, side, and front elevation views of the yoke shown in FIG. 3 in accordance with various embodiments.

FIG. 4 depicts an exemplary yoke 400 having a plurality of collars 402. The yoke 400 is characterized by a collar inside diameter 404 in the range of 1.95 inches (49.408 mm), a center-to-center dimension 406 in the range of 2.6 inches (66.091 mm), a width dimension 408 in the range of 5.26 inches (133.72 mm), a length dimension 403 in the range of 7.87 inches (199.817 mm), a height dimension 412 in the range of 0.66 inches (16.700 mm), and a thickness dimension 414 in the range of 0.01 to 0.05 inches and preferably about 0.03 inches (0.8 mm).

Figure 5:
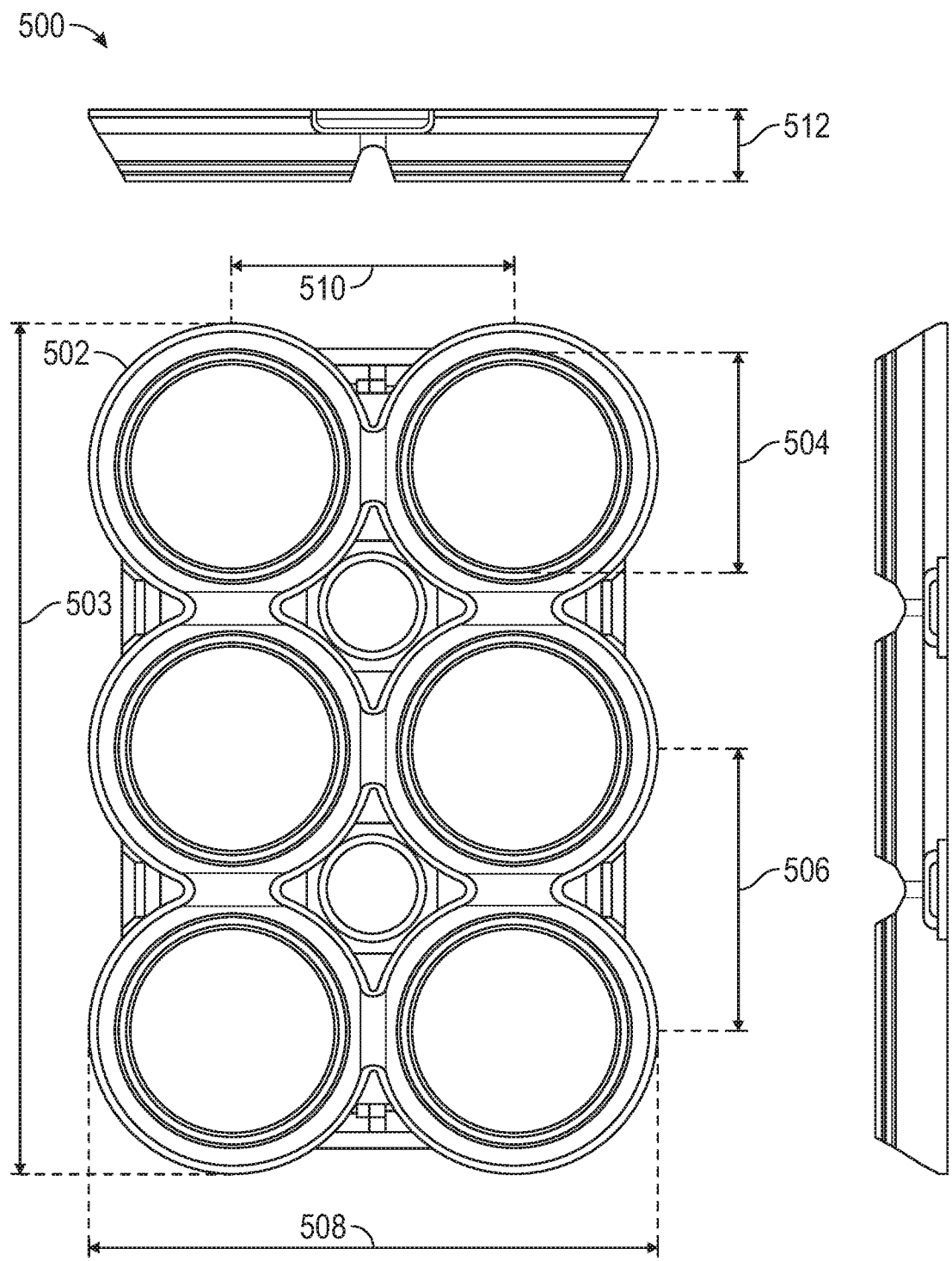
FIG. 5 depicts respective top plan, side, and front elevation views of an alternate yoke embodiment in accordance with various embodiments.

FIG. 5 depicts an exemplary skinny can yoke 500 having a plurality of collars 502. The yoke 500 is characterized by a collar inside diameter 504 in the range of 1.91 inches (48.408 mm), a center-to-center dimension 506 in the range of 2.48 inches (63.09 mm), a width dimension 508 in the range of 5.16 inches (131.0 mm), a length dimension 503 in the range of 7.64 inches (194.1 mm), a height dimension 512 in the range of 0.66 inches (16.7 mm), and a thickness dimension 414 in the range of 0.01 to 0.05 inches and preferably about 0.03 inches (0.8 mm).

FIG. 6 depicts a four pack beverage yoke 600 including plurality of collars 602 and a single finger hole 604.

FIG. 7 depicts an exemplary four can yoke 700 having respective collars 702. The yoke 700 is characterized by a collar inside diameter 703 in the range of 1.91 inches (48.408 mm), respective center-to-center dimension 704 and 706 in the range of 2.6 inches (66.09 mm), a width dimension 708 in the range of 5.28 inches (134.0 mm), a length dimension 710 in the range of 5.28 inches (134.0 mm), a height dimension 714 in the range of 0.66 inches (16.7 mm), and a thickness dimension 715 in the range of 0.01 to 0.05 inches and preferably about 0.03 inches (0.8 mm).

FIG. 8 depicts an exemplary male vacuum form die component 802 including a plurality of collar plugs 804, a wire mesh 806 configured to collect fiber particles into the shape of the finished yoke, and respective finger hole plugs 808.

FIG. 9 depicts an exemplary male drying press component 900 including respective collar plugs 902 against which the finished yoke 904 is pressed during the drying cycle for drying a fiber based beverage yoke in accordance with various embodiments;

FIG. 10 depicts an exemplary female drying press component 1000 including female receptors 1004 for securing the finished yoke against the corresponding male plugs shown in FIG. 9, and a plurality of vent holes 1006.

Those skilled in the art will appreciate that the tolerances associated with the inner diameter of receptors 1004 (FIG. 10) and the outer diameter of plugs 804 (FIG. 8) may be tightly controlled to achieve a clean cut in the inside diameters of the resulting collars, thereby eliminating the need for subsequent die cutting.

As briefly mentioned above, the various slurries used to vacuum mold carrying yokes according to the present invention comprises a fiber base mixture of pulp and water, with added chemical components to impart desired performance characteristics of the finished yoke. The base fiber may include any one or combination of at least the following materials: softwood (SW), bagasse, bamboo, old corrugated containers (OCC), and newsprint (NP). Alternatively, the base fiber may be selected in accordance with the following resources, the entire contents of which are hereby incorporated by this reference: "Lignocellulosic Fibers and Wood Handbook: Renewable Materials for Today's Environment," edited by Mohamed Naceur Belgacem and Antonio Pizzi (Copyright 2016 by Scrivener Publishing, LLC) and available at books.google.com/books?id=jTL8CwAAQBAJ&printsec=frontcover#v=onepage&q&f=false; "Efficient Use of Flourescent Whitening Agents and Shading Colorants in the Production of White Paper and Board" by Liisa Ohlsson and Robert Federe, Published Oct. 8, 2002 in the African Pulp and Paper Week and available at tappsa.co.za/archieve/APPW2002/Title/Efficient use of fluorescent w/efficient use of fluorescent w.html; Cellulosic Pulps, Fibres and Materials: Cellucon '98 Proceedings, edited by J F Kennedy, G O Phillips, P A Williams, copyright 200 by Woodhead Publishing Ltd. and available at books.google.com/books?id=xO2iAgAAQBAJ&printsec=frontcover#v=onepage&q&f=false; and U.S. Pat. No. 5,169,497 entitled "Application of Enzymes and Flocculants for Enhancing the Freeness of Paper Making Pulp" issued Dec. 8, 1992.

For vacuum molded produce containers manufactured using either a wet or dry press, a fiber base of OCC and NP may be used, where the OCC component is between 50%-100%, and preferably about 70% OCC and 30% NP, with an added moisture/water repellant in the range of 1%-10% by weight, and preferably about 1.5%-4%, and most preferably about 4%. In a preferred embodiment, the moisture/water barrier component may comprise alkylketene dimer (AKD) (for example, AKD 80) and/or long chain diketenes, available from FOBCHEM at fobchem.com/html_products/Alkyl-Ketene-Dimer%EF%88AKD-WAX%EF%BC%89.html#.VozozvkrKUk; and Yanzhou Tiancheng Chemical Co., Ltd. at yztianchengchem.com/en/index.php?m=content&c=index&a=show&catid=38&id=124&gclid=CPbn65aUg80CFRCOaQodoJUGRg.

In order to yield specific colors for fiber molded yokes, cationic dye or fiber reactive dye may be added to the pulp. Fiber reactive dyes, such as Procion MX, bond with the fiber at a molecular level, becoming chemically part of the fabric. Also, adding salt, soda ash and/or increase pulp temperature will help the absorbed dye to be furtherly locked in the fabric to prevent color bleeding and enhance the color depth.

To enhance structural rigidity, a starch component may be added to the slurry, for example, liquid starches available commercially as Topcat® L98 cationic additive, Hercobond, and Topcat® L95 cationic additive (available from Penford Products Co. of Cedar Rapids, Iowa). Alternatively, the liquid starch can also be combined with low charge liquid cationic starches such as those available as Penbond® cationic additive and PAF 9137 BR cationic additive (also available from Penford Products Co., Cedar Rapids, Iowa).

Alternatively or in addition to the foregoing, Topcat L95 may be added as a percent by weight in the range of 0.5%-10%, and preferably about 1%-7%, and particularly for products which need maintain strength in a high moisture environment most preferably about 6.5%; otherwise, most preferably about 1.5-2.0%.

Dry strength additives such as Topcat L95 or Hercobond which are made from modified polyamines that form both hydrogen and ionic bonds with fibers and fines. Dry strength additives help to increase dry strength, as well as drainage and retention, and are also effective in fixing anions, hydrophobes and sizing agents into fiber products. The forgoing additives may be added as a percent by weight in the range of 0.5%-10%, and preferably about 1%-6%, and most preferably about 3.5%. In addition, both wet and dry processes may benefit from the addition of wet strength additives, for example solutions formulated with polyamide-epichlorohydrin (PAE) resin such as Kymene 577 or similar component available from Ashland Specialty Chemical Products at ashland.com/products. In a preferred embodiment, Kymene 577 may be added in a percent by volume range of 0.5%-10%, and preferably about 1%-4%, and most preferably about 2% or equal amount with dosing of dry strength additives. Kymene 577 is of the class of polycationic materials containing an average of two or more amino and/or quaternary ammonium salt groups per molecule. Such amino groups tend to protonate in acidic solutions to produce cationic species. Other examples of polycationic materials include polymers derived from the modification with epichlorohydrin of amino containing polyamides such as those prepared from the condensation adipic acid and dimethylene triamine, available commercially as Hercosett 57 from Hercules and Catalyst 3774 from Ciba-Geigy.

To strengthen the finished yoke, a dry strength additive such as an inorganic salt (e.g., Hercobond 6950 available at solenis.com/en/industries/tissue-towel/innovations/hercobond-dry-strength-additives/; see also http://www.sfm.state.or.us/CR2K_SubDB/MSDS/HERCOBOND_69 50.PDF) may be employed in the range of 0.5%-10% by weight, and preferably about 1.5%-5%, and most preferably about 4%.

As discussed above, the slurry chemistry may be combined with structural features such as ribs located between the collars to provide enhanced rigidity over time even in wet environments.

While the present invention has been described in the context of the foregoing embodiments, it will be appreciated that the invention is not so limited. For example, the various geometric features and chemistries may be adjusted to accommodate additional applications based on the teachings of the present invention.

A method is thus provided for manufacturing a beverage yoke. The method includes: forming a wire mesh over a mold comprising a mirror image of the yoke including a plurality of collars interconnected by a web; immersing the wire mesh in a fiber-based slurry bath; drawing a vacuum across the wire mesh to cause fiber particles to accumulate at the wire mesh surface; and removing the wire mesh from the slurry bath; wherein the slurry comprises a moisture/water barrier component in the range of 1.5%-4% by weight.

In an embodiment the slurry comprises a moisture barrier component in the range of about 4%.

In an embodiment the moisture barrier component comprises alkyl ketene dimer (AKD).

In an embodiment the moisture barrier component comprises alkyl ketene dimer (AKD) 80.

In an embodiment the slurry comprises a fiber base of OCC/NP at a ratio in the range of 0.5/9.5.

In an embodiment the slurry further comprises a dry strength component in the range of 1%-7% by weight.

In an embodiment the starch component comprises a cationic liquid starch.

In an embodiment the slurry further comprises a wet strength component such as Kymene (e.g., Kymene 577) in the range of 1%-4% by weight.

In an embodiment the moisture/water barrier comprises AKD in the range of about 4%, wherein the AKD may be added to the pulp slurry as a diluted solution (e.g., 1:10 ADK:Water); the slurry comprises a cationic liquid starch component in the range of 1%-7%.

In an embodiment the slurry further comprises a rigidity component in the range of 1%-5% by weight.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A method of manufacturing a yoke configured to carry beverage cans, comprising:
   providing a wire mesh mold in the shape of the yoke;
   immersing the mold in a fiber-based slurry;
   drawing a vacuum across the wire mold to cause fiber particles to accumulate at the wire mesh surface; and
   removing the mold and attached fiber particles from the slurry; and
   subsequently drying the fiber particles to yield the yoke;
   wherein the slurry comprises a moisture barrier.

2. The method of claim 1, wherein the moisture barrier is in the range of 0.5%-10% by weight.

3. The method of claim 2, wherein the moisture barrier comprises alkyl ketene dimer (AKD).

4. The method of claim 1, wherein the moisture barrier comprises alkyl ketene dimer (AKD) 3.

5. The method of claim 1 wherein the slurry comprises a fiber base of about 70% old corrugated containers (OCC) and about 30% newsprint (NP).

6. The method of claim 1, wherein the slurry further comprises a strength additive in the range of 1.5%-4% by weight.

7. The method of claim 6, wherein the strength additive comprises Hercobond.

8. The method of claim 1, wherein:
the moisture barrier comprises AKD in the range of about 4%; and
the slurry comprises old corrugated containers (OCC) and newsprint (NP).

9. A method of manufacturing a carrier for cylindrically shaped containers, comprising:
providing a mesh mold in the shape of the carrier;
immersing the mold in a fiber-based slurry;
drawing a vacuum across the mold to cause fiber particles to accumulate at the mesh surface; and
removing the mold and accumulated fiber particles from the slurry; and
subsequently drying the fiber particles to yield the carrier;
wherein the slurry comprises:
a fiber base including at least one of old corrugated containers (OCC) and NP;
a moisture barrier additive in the range of about 4% by weight;
a wet strength additive in the range of about 4% by weight; and
a dry strength additive in the range of about 4% by weight.

10. The method of claim 9, wherein:
the moisture barrier additive comprises AKD;
the wet strength additive comprises a polyamidoamine-epichlorohydrin (PAE) resin; and
the dry strength additive comprises a cationic modified polyamine water soluble polymer.

11. The method of claim 9, wherein the carrier comprises a plurality of collars interconnected by a web, wherein each collar exhibits a nominal diameter of about 1.95 inches and the web exhibits a substantially uniform thickness of about 0.03 inches.

* * * * *